(12) United States Patent
Fritz-Jung et al.

(10) Patent No.: US 6,270,820 B1
(45) Date of Patent: Aug. 7, 2001

(54) PROCESS FOR DRY STABLE INTERMEDIATE PET FOOD COMPOSITION

(75) Inventors: Cathryn (Kati) Fritz-Jung, University City; Bhajmohan (Ricky) Singh, St. Louis; Sandeep Bhatnagar, Creve Coeur; Gary J. Woodward, University City; Karl L. Kettinger, St. Louis; Donald R. Speck, Festus; Jill A. Stoll, Webster Groves; Stephen E. Woerz, Florissant; Peifang Zhang, Creve Coeur, all of MO (US)

(73) Assignee: Ralston Purina Company, St. Louis, MO (US)

( * ) Notice: Subject to any disclaimer, the term of this patent is extended or adjusted under 35 U.S.C. 154(b) by 0 days.

(21) Appl. No.: 09/498,286

(22) Filed: Feb. 4, 2000

(51) Int. Cl.$^7$ ........................................... A23B 4/10
(52) U.S. Cl. .................. 426/302; 426/310; 426/443; 426/574; 426/641; 426/654; 426/657; 426/805; 426/457
(58) Field of Search ..................................... 426/302, 310, 426/574, 641, 654, 657, 443, 805, 457

(56) References Cited

U.S. PATENT DOCUMENTS

| | | | | |
|---|---|---|---|---|
| 3,959,511 | * | 5/1976 | Balaz et al. | 426/549 |
| 4,212,894 | * | 7/1980 | Franzen, Jr. et al. | 426/332 |
| 4,384,009 | * | 5/1983 | Lewis et al. | 426/646 |
| 4,410,551 | * | 10/1983 | Comers | 426/99 |
| 4,665,862 | * | 5/1987 | Pitchford, Jr. | 119/51.11 |
| 4,702,924 | * | 10/1987 | Owens et al. | 426/92 |
| 5,968,569 | * | 10/1999 | Cavadini et al. | 426/61 |

* cited by examiner

Primary Examiner—Chhaya D. Sayala
(74) Attorney, Agent, or Firm—Armstrong Teasdale LLP

(57) ABSTRACT

A process for making a dry, stable intermediate pet food including meat includes the steps of combining a plurality of ingredients specified by a basal pet food formula, wherein the plurality of ingredients includes a slurry of meat, mixing the plurality of ingredients to form a basal mixture, extruding the basal mixture, cutting the extruded basal mixture into flakes, and drying the flakes to a moisture content of less than about 10% by weight. In one embodiment, to make a finished pet food composition, the flakes are shipped for final processing to a processing facility having finishing equipment including grinding, extruding and coating equipment.

32 Claims, 1 Drawing Sheet

PROCESS FOR DRY STABLE INTERMEDIATE PET FOOD COMPOSITION

BACKGROUND OF THE INVENTION

This invention relates generally to pet foods and, more particularly, to a process for making a dry, stable intermediate pet food composition.

Pet food compositions are subject to deterioration in transit, although deterioration is not usually a problem as long as the finished product is not shipped over long distances. However, many manufacturers in the United States recognize a growing demand for premium and super-premium pet food products in developing international markets. Typically, within such markets, manufacturers have not installed the full capacity (meat slurry) plant systems which are required to process the pet food compositions. Thus, to meet the demand, manufacturers face the choice of exporting finished product over long distances from existing full capacity plants, or investing in full capacity plants in the newly opened markets.

Manufacturers who choose to export finished product over long distances face a risk of product loss due to deterioration during shipping, handling and storage. Further, the time between placement and filling of regional orders is extended. In shipping from a distant full capacity plant system, manufacturers also have less flexibility in meeting the demands and regulations of local markets. Specifically, exporting manufacturers are at a disadvantage in adapting product packaging and marketing to local languages, marketing preferences, and in meeting local quality and packaging standards.

One solution is for manufacturers to install, within local markets, full capacity plant systems with the ability to make finished product for local distribution. However, this option is of course very costly and involves significant financial risk for the manufacturer. Another option is to co-manufacture product at local installations which have meat-handling capability. However, this approach has the disadvantage of requiring the manufacturer to divulge proprietary processing details to sources outside the organization.

It would therefore be desirable to provide a method which allows pet food manufacturers to meet the demands of international markets for premium and super-premium pet foods without having to export finished product. It would also be desirable to provide such a method which minimizes the financial risk associated with capital investment in local markets. It would be further desirable to provide such a method with flexibility in the finishing process to allow customization of finished product to the demands of local markets. It would be still further desirable to provide such a method which allows manufacturers to customize product packaging to the demands of local markets. It would be yet still further desirable to provide such a method which allows the manufacturer to reach local markets without divulging proprietary processing details to sources outside the manufacturer's organization.

BRIEF SUMMARY OF THE INVENTION

In an exemplary embodiment of the invention, a process for making a stable intermediate pet food composition includes the steps of combining a plurality of ingredients specified by a basal pet food formula to form a basal mixture, and processing the basal mixture to produce a dry, stable intermediate pet food composition containing meat. More specifically, and in one embodiment, the step of processing the basal mixture includes extruding the basal mixture, cutting the extruded basal mixture into flakes, and drying the flakes to a moisture content of less than about 10% by weight. The intermediate pet food composition, in the form of dried flakes, is then packaged in storage containers and stored until needed to produce a finished pet food composition. In one embodiment, the process further includes the steps of transporting the pet food composition to a processing facility, and re-processing the dry flakes to produce the finished product.

DETAILED DESCRIPTION OF THE INVENTION

Figure 1:
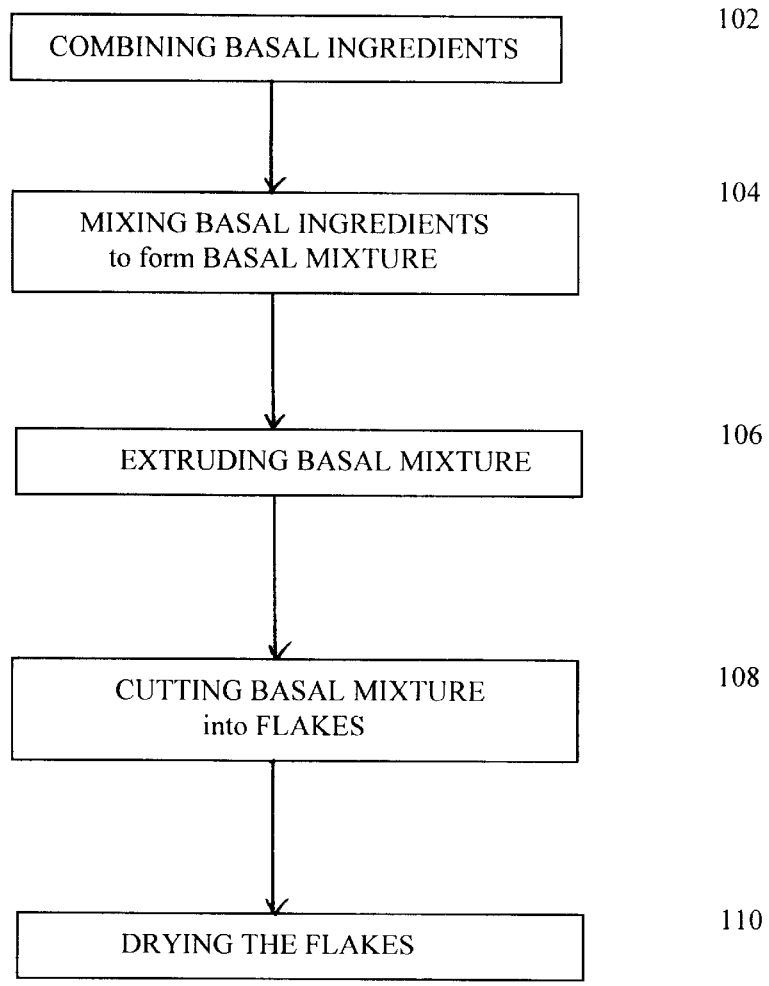
FIG. 1 is a flow chart of the steps of a process for making a dry stable intermediate pet food composition.

Referring now to FIG. 1, a process 100 for making a dry stable intermediate pet food composition includes, in one embodiment, the steps of combining 102 a plurality of ingredients specified by a basal pet food formula, wherein the plurality of ingredients includes a slurry of meat, mixing 104 the plurality of ingredients to form a basal mixture, extruding 106 the basal mixture, cutting 108 the extruded basal mixture into flakes 108, and drying 110 the flakes to a moisture content of less than about 10% by weight to form a dry, stable intermediate pet food composition.

In an exemplary embodiment, the steps of process 100 are practiced at a plant having meat slurry processing capability, such as a full capacity plant. However, any plant having meat slurry processing capability is suitable for practicing process 100. In one embodiment, the plant further has packaging capability and process 100 further includes the steps of packaging the dry, stable intermediate pet food composition in containers suitable for storage, and transporting the pet food composition for finishing to a processing facility remote from the plant. In this embodiment, the dry, stable intermediate pet food composition is packaged and shipped to the remote processing facility. During shipping and storage, the dry, stable intermediate pet food composition resists deterioration. At the remote processing facility, the flakes are re-processed to produce a finished pet food composition, and then packaged for local distribution.

More specifically, step 102 for making a dry stable intermediate pet food composition includes the step of combining a plurality of ingredients specified by the basal pet food formula, wherein the basal pet food formula includes as an ingredient a slurry of meat. The meat slurry is prepared from, for example, frozen or freeze-dried meat, or from fresh meat. Therefore, the steps of process 100 are practiced at a plant having meat slurry processing capability. The plurality of ingredients typically also includes, for example, grains, minerals, amino acids and the like. However, the basal formula varies according to, for example, the species, age and activity level of the pet. For example, a suitable basal formula for a cat food intermediate composition includes grains, minerals, meat meal and taurine.

Referring to steps 102 and 104, the plurality of ingredients specified by the basal formula are combined and mixed in a mixer as known in the art, thus forming a basal mixture. Before further processing, the basal mixture has a moisture content of about 10% to about 30% by weight, a moisture content suitable for extruding. The basal mixture is then extruded and cut to flakes having a thickness of about 3/32 inches to about 10/32 inches, or other thicknesses suitable for drying. In an exemplary embodiment, the flakes are about ³⁄₃₂ of an inch. To form a dry, stable intermediate pet food composition, the flakes are then dried to a moisture content of less than about 10% by weight, in a dryer as known in the art. In one embodiment, the flakes are dried to a moisture content of about 4% up to about 10% by weight. In an exemplary embodiment, the moisture content is about 7% by weight.

The moisture content of the dried flakes is less than the typical moisture content of finished premium and super-premium pet food compositions to enhance shelf stability of the intermediate pet food composition. In one embodiment, to further enhance shelf stability, a food preservative or preservative composition is applied to the flakes. In an alternative embodiment, a food preservative or preservative composition is added at other processing stages, such as at the basal formula stage, or at the slurry stage. A suitable preservative composition is, for example, a BHA/BHT blend concentrated in corn oil and applied to the flakes at about 50 to about 200 ppm on a fat basis. Other suitable preservatives include, for example, antioxidants such as Ethoxyquin, propyl gallate or natural phenolic compounds, and antimicrobials such as propionic acid or other organic acids, propionates, benzoates, phenolics or bacteriocins. The dry, stable intermediate pet food composition, in the form of flakes, is then packaged in storage containers such as, for example, sacks or barrels. In one embodiment, the containers are also suitable for shipping and provide shelf stability of at least about 18 months or more. For example, in one embodiment the dried flakes are packaged in large super sacks available from U.S. Sack Corporation, Grand Junction, Col.

In one embodiment, the intermediate pet food composition is then shipped from the plant to a local processing facility located at a site remote from the plant. Typically, the plant is located in the United States, and the local processing facility is located in an export country, for example at an overseas location. However, process 100 is not limited to international export applications. The intermediate pet food composition is suitable for use in any situation calling for enhanced shelf stability required for storage of a premium or super-premium pet food formulated with meat, and where a local processing facility has at least finishing and packaging capabilities.

The local processing facility re-processes the dry flakes to produce a finished premium or super-premium pet food product, including applying finish coatings. In one embodiment, the local processing facility also does packaging of the finished product for retail sale. More specifically, and in one embodiment, the local processing facility has equipment suitable for grinding, extruding, drying, coating and packaging. Upon receipt of the stable intermediate pet food composition in the form of dry flakes, individuals at the local processing facility inspect the flakes for any signs of deterioration, and store the flakes until needed for final finishing. To prepare a finished product, the flakes are ground in a grinder or grinding system such as a Bliss mill grinding system, to a modulus of fineness (MOF) of about 80 to about 180. In an exemplary embodiment, the flakes are ground to an MOF of about 120 to about 140. The ground flakes are then re-extruded and cut to form pieces, or kibble. The pieces or kibble are formed in shapes and sizes suitable for local market demand. The pieces are then dried in a dryer to a moisture content of about 4 to about 10%, and spray-coated or dusted with a suitable coating material. The coating material is, for example, liquid animal digest, concentrated liquid animal digest, fat, tallow or a dry coating such as dried yeast. In one embodiment, the coating material is also shipped to the local processing facility from the full capacity plant or from another supply facility at a distant location. The coating material is then stored until needed for product finishing.

The finished premium or super-premium pet food product is then packaged in containers suitable for retail sale, such as labeled boxes, bags or bottles. Usually, the local facility is better situated than an overseas facility to understand and comply with local, regional or national standards regarding finished product quality, labeling and packaging. Therefore, in one embodiment process 100 includes the step of locally packaging the finished premium or super-premium pet food product for retail sale, to facilitate compliance with the regulations and demands of the local market. For example, in local markets that require or demand a certain type of packaging for retail sale to customers, such as a certain type of sealed packaging, the local facility packages the finished product in the required sealed packaging. Further, the local facility uses familiarity with local or regional language, idiom, culture, and consumer preferences in labeling and packaging the packages for local distribution, thereby enhancing marketing capability.

The process for making a dry, stable intermediate pet food composition thus provides a method for extending the shelf stability of premium and super-premium pet food compositions containing meat as a basal ingredient. The dry, stable intermediate pet food composition is especially suitable for export applications to local markets which have product finishing capability but not meat slurry processing capability, but is also suitable for any situation calling for extended shelf stability of such pet food compositions. For example, in an alternative embodiment, a full capacity plant, having meat slurry processing capability in addition to finishing and packaging capability, makes batches of the stable intermediate pet food composition for storage to more rapidly meet an increase in demand. Process 100 also avoids the problems which manufacturers otherwise face by bringing plants with meat processing capability directly to local markets. Further, by finishing and packaging the final pet food product locally, process 100 affords the manufacturer greater flexibility in meeting the differing demands among different local markets.

While the invention has been described in terms of various specific embodiments, those skilled in the art will recognize that the invention can be practiced with modification within the spirit and scope of the claims.

What is claimed is:

1. A process for increasing the shelf life of a pet food composition containing meat, said process comprising the steps of:

forming a dry, stable intermediate of the pet food composition, at a first location having meat slurry processing capability, said step of forming a dry stable intermediate of the pet food composition comprises the steps of:

combining a plurality of ingredients wherein the plurality of ingredients comprises a slurry of meat, mixing the plurality of ingredients to form a basal mixture, extruding the basal mixture, cutting the extruded basal mixture into flakes, and drying the flakes; and finishing the dry, stable intermediate pet food composition to form a finished pet food composition at a second location remote from the first location.

2. A process in accordance with claim 1 wherein drying the flakes comprises the step of drying the flakes to a moisture content of less than about 10% by weight.

3. A process in accordance with claim 1 wherein cutting the extruded intermediate composition into flakes comprises the step of cutting the extruded intermediate composition into flakes having a thickness of about 3/32 to about 10/32 of an inch.

4. A process in accordance with claim 1 further comprising the step of packaging the flakes in storage containers.

5. A process in accordance with claim 1 wherein finishing the stable intermediate pet food composition comprises the steps of:

grinding the stable intermediate pet food composition;

re-extruding the stable intermediate pet food composition;

cutting the re-extruded stable intermediate pet food composition to form pieces; and drying the pieces.

6. A process in accordance with claim 1 wherein finishing the stable intermediate pet food composition further comprises the steps of:

coating the pieces with a coating material; and packaging the pieces.

7. A process for making a table pet food composition containing meat, said process comprising the steps of:

forming a basal mixture from a plurality of ingredients including meat;

extruding the basal mixture;

cutting the basal mixture into pieces;

drying the pieces to form a stable intermediate pet food composition;

storing the intermediate pet food composition for a determined period of time;

grinding the stable intermediate pet food composition;

re-extruding the stable intermediate pet food composition;

cutting the re-extruded stable intermediate pet food composition to form pieces; and drying the pieces.

8. A process in accordance with claim 7 wherein forming the basal mixture comprises the step of forming the basal mixture with a moisture content of about 10% to about 30% by weight.

9. A process in accordance with claim 7 wherein cutting the basal mixture into pieces comprises cutting the basal mixture into flakes.

10. A process in accordance with claim 7 wherein cutting the extruded basal mixture into flakes comprises the step of cutting the extruded basal mixture to form flakes having a thickness of about 3/32 to about 10/32 of an inch.

11. A process in accordance with claim 7 wherein drying the pieces comprises the step of drying the pieces to a moisture content of less than about 10% by weight.

12. A process in accordance with claim 7 further comprising the step of packaging the stable intermediate pet food composition at a first location.

13. A process in accordance with claim 7 wherein packaging the stable intermediate pet food composition comprises packaging the stable intermediate pet food composition in storage containers.

14. A process in accordance with claim 7 further comprising the step of re-processing the stable intermediate pet food composition to form a finished pet food composition.

15. A process in accordance with claim 14 wherein re-processing the stable intermediate pet food composition to form a finished pet food composition comprises re-processing the stable intermediate pet food composition at a second location.

16. A process in accordance with claim 7 wherein re-processing the stable intermediate pet food composition further comprises the steps of:

coating the pieces with a coating material; and packaging the pieces.

17. A process in accordance with claim 15 further comprising the steps of:

packaging a quantity of the coating material at the first location; and transporting the quantity of coating material from the first location to the second location.

18. A process for making a pet food composition containing meat, said process comprising the steps of:

forming a dry, stable intermediate product of the pet food composition comprising the steps of:

combining a plurality of ingredients to form a meat slurry, and processing the meat slurry to form a dried, intermediate product; said steps of combining a plurality of ingredients and processing the meat slurry performed at a first location; and re-processing the dried, intermediate product to form a finished pet food composition at a second location remote from the first location.

19. A method in accordance with claim 18 wherein said step of processing the meat slurry to form a dried, intermediate product comprises the steps of:

mixing the plurality of ingredients to form a basal mixture;

extruding the basal mixture;

cutting the extruded basal mixture; and drying the cut, extruded mixture.

20. A method in accordance with claim 19 wherein said step of cutting the extruded basal mixture comprises the step of cutting the extruded basal mixture into flakes.

21. A method in accordance with claim 18 wherein the dried, intermediate product comprises dried flakes, said step of re-processing the dried, intermediate product comprises the step of processing the dried flakes into dried pieces.

22. A method in accordance with claim 18 wherein the dried, intermediate product comprises extruded and dried flakes, said step of re-processing the dried, intermediate product comprises the step of processing the extruded and dried flakes into re-extruded pieces.

23. A method in accordance with claim 18 wherein said step of re-processing the dried, intermediate product comprises the steps of:

grinding the dried, intermediate product;

re-extruding the product;

cutting the re-extruded product to form pieces; and drying the pieces.

24. A method in accordance with claim 23 further comprising the steps of:

coating the pieces with a coating material; and packaging the pieces.

25. A method in accordance with claim 18 further comprising the steps of:

coating the reprocessed dried, intermediate product with a coating material; and packaging the coated product.

26. A process for making a pet food composition containing meat, said process comprising the steps of:
   forming a basal mixture from a plurality of ingredients including meat;
   extruding the basal mixture;
   forming a dry, intermediate product;
   storing the dry, intermediate product for a determined period of time;
   grinding the dry, intermediate product;
   processing the ground product; and
   forming a dry, finished product.

27. A process in accordance with claim 26 wherein said step of forming a dry, intermediate product comprises the steps of:
   cutting the extruded mixture into pieces; and
   drying the pieces to form an intermediate product.

28. A process in accordance with claim 26 wherein said step of forming a dry, intermediate product comprises the step of forming dry flakes.

29. A process in accordance with claim 26 wherein said step of processing the ground product comprises the step of extruding the ground product.

30. A process in accordance with claim 26 further comprising the steps of:
   coating the pieces with a coating material; and
   packaging the pieces.

31. A process in accordance with claim 26 further comprising the steps of:
   packaging the dry, intermediate product at first location; and
   grinding the dry, intermediate product at a second location.

32. A process in accordance with claim 26 wherein said step of forming a dry, finished product comprises the steps of:
   cutting the processed, ground product to form pieces; and
   drying the pieces.

* * * * *